Feb. 12, 1963   W. L. CARLSON   3,077,030
METHOD OF FORMING LOCATORS
Filed May 21, 1959   2 Sheets-Sheet 1

INVENTOR.
Wilbur L. Carlson
BY
W. E. Finken
HIS ATTORNEY

Feb. 12, 1963 W. L. CARLSON 3,077,030
METHOD OF FORMING LOCATORS
Filed May 21, 1959 2 Sheets-Sheet 2

INVENTOR.
Wilbur L. Carlson
BY
W. E. Finken
HIS ATTORNEY ated Feb. 12, 1963

3,077,030
METHOD OF FORMING LOCATORS
Wilbur L. Carlson, Rochester, N.Y., assignor to General Motors Corporation, Detroit, Mich., a corporation of Delaware
Filed May 21, 1959, Ser. No. 814,811
7 Claims. (Cl. 29—407)

This invention pertains to a method of forming precise locators on an article which is to be subsequently assembled with a mating article, and also to an article having integral extruded locators.

It is often times necessary to accurately locate mating parts prior to final assembly of the parts to enable subsequent subassembly operations on the parts themselves and assure proper fitting of the parts during the final assembly operation. For example, in the manufacture of small direct current motors of the general type disclosed in copending application S.N. 680,238 filed August 26, 1957, in the name of Simmons et al. and assigned to the assignee of the present invention, wherein the motor includes an integral worm gear reduction, each gear reduction housing must be accurately located with respect to its mating frame. The disclosed embodiment of the present invention relates to a method of forming accurate locators on a gear reduction housing composed of aluminum. However, this embodiment is to be construed only by way of example, and not by way of limitation, since it is readily apparent that the method disclosed therein is applicable to numerous manufactured articles having mating parts. Accordingly, among my objects are the provision of a method of forming locators on one of a pair of mating parts; and the further provision of a method of forming precise locators utilizing a spinning technique.

The aforementioned and other objects are accomplished in the present invention by prelocating and clamping together the mating parts and thereafter forming a plurality of locators on one of the parts by a spinning operation. Specifically, in the disclosed embodiment the mating parts comprise a substantially rectangular motor frame and a die cast aluminum gear reduction housing. In carrying out the present invention it is essential that the mating part on which the locators are not formed be composed of material having a strength and hardness substantially greater than the part on which the locators are spun in situ. Thus, for example, when the part having the locators is composed of aluminum, the mating part may be composed of annealed hot rolled steel.

The gear reduction housing and the frame are accurately prelocated prior to the spinning operation by centrally locating the gear reduction housing on one end of the motor frame, which includes a field coil assembly. To achieve this result, an arbor is concentrically located within the air gap, the arbor having a shaft extending into the sleeve bearing of the gear reduction housing. The gear reduction housing and the frame are then clamped together and high speed spinning tools are brought into engagement with the aluminum gear reduction housing. The spinning tools are pressed against the housing with a force substantially equal to the compressive strength of the aluminum and are located partially over a corner or edge of the frame. The localized heat created by the friction between the spinning tool and the aluminum gear reduction housing causes the aluminum of flow ahead of the spinning tool and into the corner or edge of the motor frame thereby forming a precise locator.

After the locators have been formed in the gear reduction housing, the two parts can be separated for subsequent subassembly operations. However, the mated parts are kept together so that when the final assembly stage is reached the two parts can be reassembled on the extruded locators to form a completed unit.

Further objects and advantages of the present invention will be apparent from the following description, reference being had to the accompanying drawings, wherein a preferred embodiment of the present invention is clearly shown.

Figure 1:
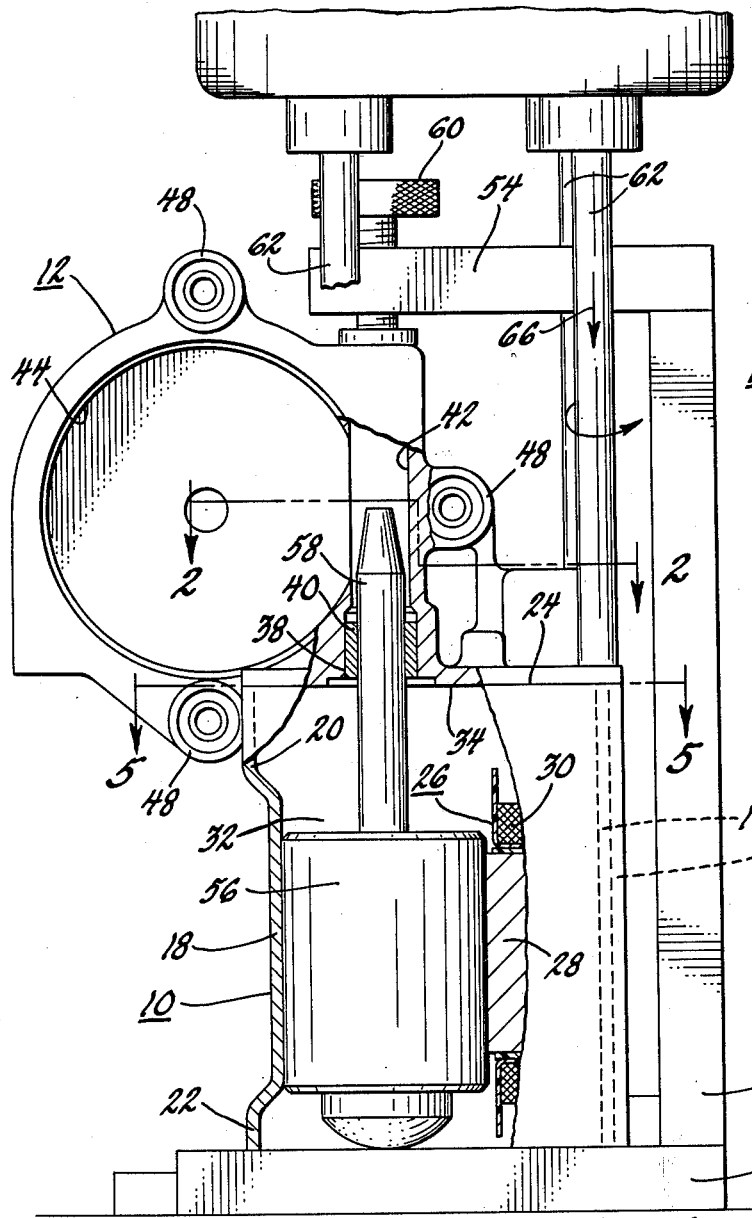
FIGURE 1 is a view, partly in section and partly in elevation, of the mating parts as held in a clamping fixture during the locator forming operation.

With particular reference to FIGURE 1, a single piece sheet metal motor frame 10 of substantially rectangular configuration and a die cast aluminum gear reduction housing 12 comprise the mating parts of the disclosed assembly. The frame 10 may be constructed in accordance with the aforementioned copending application and thus includes overlapping end portions 14 and 16, which are suitably interconnected, and an intermediate arcuate portion 18 on the opposite side thereof. The end portions 20 and 22 opposite the overlapped portions 14 and 16 are bulged outwardly so as to accommodate parts of the motor assembly.

Figure 5:
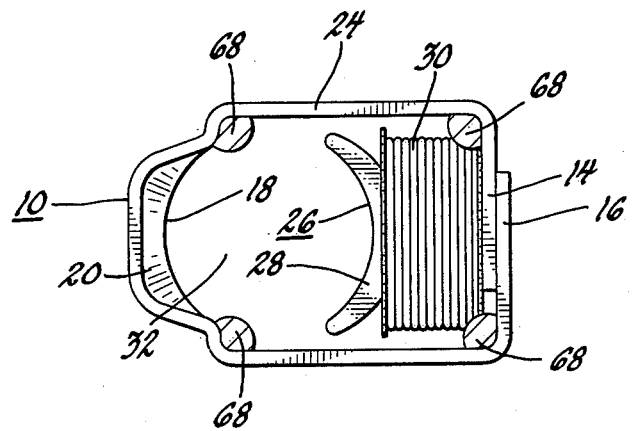
FIGURE 5 is a sectional view taken along line 5—5 of FIGURE 1 after the locators are formed on one of the mating parts and with the arbor removed.

The upper edges of the frame designated by numeral 24 and shown clearly in FIGURE 5, are smooth and lie in a single plane. The frame is composed of annealed hot rolled steel, and as shown in FIGURE 1, has a field coil assembly 26 mounted therein. The field coil assembly comprises a pole piece 28, which is suitably attached to the overlapped end portions 14 and 16, and a coil assembly 30. A substantially cylindrical air gap 32 is formed between the pole piece 28 and the arcuate portion 18 of the fame. Due to variations in the thickness of the steel strip from which the frames 10 are made, it will be appreciated that there may be an appreciable variation in the dimensions of the frames at the gear reduction end.

The gear reduction housing 12 includes a substantially flat surface 34 having a pair of holes 36 therein through which tie bolts are adapted to extend, and a centrally located opening 38 which, as shown in FIGURE 1, is fitted with a sleeve bearing 40. The sleeve bearing 40 is coaxial with a cylindrical bore 42 of the housing 12, and the housing 12 includes a second cylindrical bore 44 located in a plane at right angles to the bore 42 and intersecting the same. The bore 44 is adapted to receive a worm gear, not shown, the shaft of which is journalled in an opening 46 in the housing 12. The motor armature shaft, not shown, may be formed with an integral worm having driving engagement with the worm gear. The housing 12 includes a plurality of integral bosses 48 which are used as motor mounts.

After the field assembly 26 has been assembled within the frame 10, and the sleeve bearing 40 has been assembled with the housing 12, the frame and the housing are clamped together in a fixture. As shown in FIGURE 1, the fixture includes a base 50 having an upstanding leg 52 with an upper arm portion 54. An arbor 56 is positioned within the air gap 32, the arbor 56 having an integral shaft 58 projecting through the sleeve bearing 40. The arbor 56 is used to properly locate the housing relative to the frame 10. After these parts are properly located they are clamped together by any suitable means, such as a screw device 60 indicated in FIGURE 1.

Figure 3:
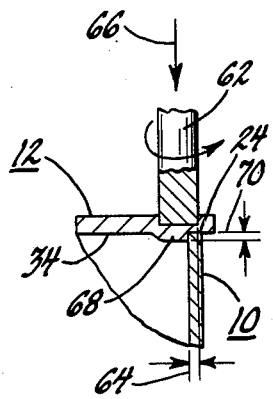
FIGURE 3 is a fragmentary, sectional view taken along line 3—3 of FIGURE 2.
Figure 2:
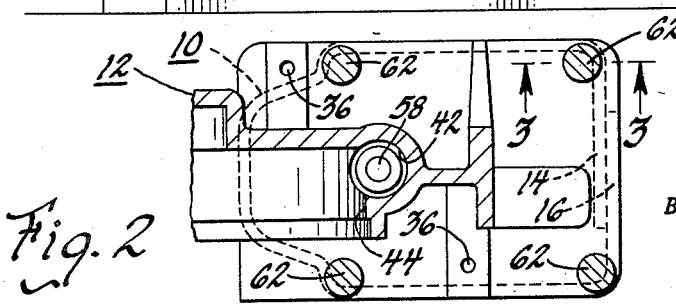
FIGURE 2 is a fragmentary, sectional view taken along line 2—2 of FIGURE 1.
Figure 4:
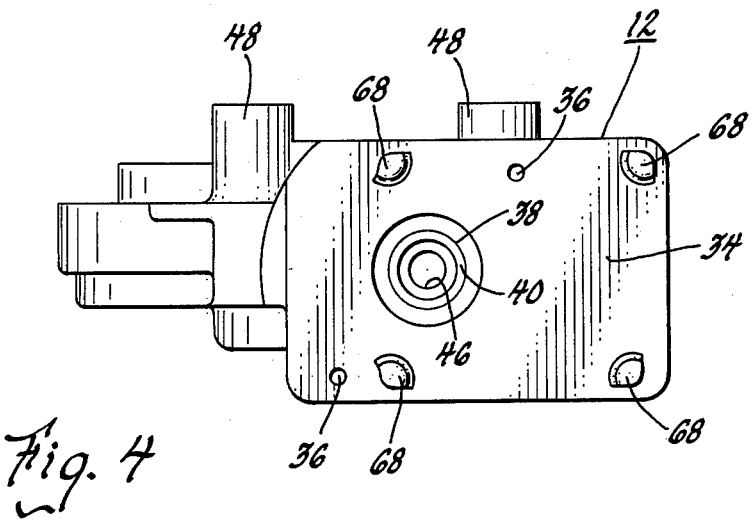
FIGURE 4 is an end view of the mating part with the extruded locators.

Thereafter, one or more spinning tools 62 composed of a relatively hard material, such as sintered carbide, are brought into engagement with the upper surface of the housing 12. The tools 62 have a cylindrical cross section and the ends thereof are substantially flat, as shown in FIGURE 1. The tools 62 are rotated at a relatively high speed, that is, between 10,000 and 20,000 r.p.m. and are moved longitudinally under pressure substantially equal to the compressive strength of the aluminum. As shown particularly in FIGURES 2 and 3, part of each spinning tool overlaps the upper edge 24 of the frame 10. The distance of the overlap indicated by numeral 64 in FIGURE 3 is preferably equal to substantially one-fourth of the diameter of the spinning tool 62. Due to high speed rotation of the spinning tool under pressure in the direction of arrow 66 of FIGURES 1 and 3, the friction between the spinning tool and the aluminum housing creates localized heating of the housing. This localized heating of the housing causes the aluminum to flow ahead of the spinning tool into the corner, or over the edge, of the motor frame 10 thereby forming an integral extruded locator 68. In order to reduce the time to a minimum and to improve the quality of the extruded locators, the pressure exerted on the spinning tool 62 in the direction of the arrow 66 must be as high as possible, and thus is only slightly less than the compressive strength of the material to be extruded. In this manner, the heat generated by the friction between the tool and the part to be extruded brings localized portions of the material to the flowing temperature in a relatively short time. The length 70 of each locator is substantially equal to the depth that the spinning tool is forced into the housing 12.

After the locators 68 have been formed on the housing 12, the parts are removed from the clamping fixture. Since the housing has been matched to a particular frame, the housing and frame must be kept together during all subsequent assembly operations. To complete the motor assembly of the disclosed embodiment, an armature, not shown, is mounted within the air gap of the frame and an end plate, not shown, is attached to the other end of the frame. A worm gear, not shown, is mounted in the cylindrical bore 44 of the gear reduction housing 12. When all of the subassembly operations are complete, the frame and gear reduction housing are reassembled and have a precise fit by reason of the locators 68 being matched to the particular frame as shown in FIGURE 5.

From the foregoing it is manifest that the present invention teaches a unique method of forming precise locators in a part which must be accurately located with a matching part with which it is subsequently assembled. This is particularly important where size and shape of one of the mating parts may vary considerably. Moreover, it is readily apparent that by using parts with extruded locators the time required for final assembly of matching parts can be substantially reduced.

While the embodiment of the invention as herein disclosed constitutes a preferred form, it is to be understood that other forms might be adopted.

What is claimed is as follows:

1. The method of forming locators on a first part which is to be assembled with a second part including the steps of clamping the parts in the proper assembled position, engaging the first part with a rotating spinning tool over an area including an edge of the second part, and applying pressure to the spinning tool to cause localized flow of the first part due to localized softening of the first part by heat generated due to frictional engagement between the spinning tool and the first part.

2. The method of forming locators on a first part which is to be assembled with a second part including the steps of clamping the parts in the proper assembled position, rotating and moving a spinning tool longitudinally against the first part over an area including an edge of the second part, and applying pressure to the spinning tool substantially equal to the compressive strength of the material of the first part to cause localized flowing of the pair due to localized softening of the first part by the heat generated by frictional engagemnet between the spinning tool and the first part.

3. The method of forming locators on a first part which is to be assembled with a second part which comprises, clamping the parts in the proper assembled position, and engaging the first part with a rotating spinning tool over an area including an edge of the second part and forcing the spinning tool longitudinally against the first part to form a locator by flowing the material of the first part ahead of the spinning tool due to localized softening of the first part caused by heat generated due to frictional engagement between the spinning tool and the first part.

4. The method of forming locators on a first part which is to be assembled with a second part, the first part being composed of a material having a strength and hardness substantially less than the second part, which comprises, clamping the parts in the proper assembled position, engaging the first part with a rotating spinning tool over an area including an edge of the second part, and applying pressure to the spinning tool substantially equal to the compressive strength of the material of the first part to form a locator by flowing the material of the first part over the edge of the second part due to localizing softening of the first part caused by heat generated due to frictional engagement between the spinning tool and the first part.

5. The method of forming locators on a first part which is to be assembled with a second part, the first part being composed of a material having a strength and hardness substantially less than the second part, the second part being of substantially rectangular configuration which comprises, clamping the parts in the proper assembled position, engaging the first part with a rotating spinning tool over an area including a corner of the second part, and applying pressure to the spinning tool which is only slightly less than the compressive strength of the material of the first part to form a locator by flowing the material of the first part ahead of the tool into the corner of the second part due to localized softening of the material of the first part caused by heat generated due to frictional engagement between the spinning tool and the first part.

6. The method of forming locators on a first part which is to be mated for subsequent assembly with a second part where the first part is of softer material than the second part and has a substantially flat lower surface engageable with an edge of the second part, including the steps of clamping the first part over the edge of the second part in proper alignment therewith, and forming a plurality of unsymmetrically spaced integral extruded locators depending from the lower flat surface of the first part and engageable with the edge of the second part to assure proper alignment of the mated parts upon subsequent assembly thereof.

7. The method of forming locators on a first part which is to be mated for subsequent assembly with a second part where the first part is of softer material than the second part and has a substantially flat lower surface engageable with an edge of the second part, the edge surface of the second part having a plurality of corners, including the steps of clamping the first part over the edge of the second part in proper alignment therewith, and forming a plurality of spaced integral extruded locators depending from the flat surface of the first part and engageable with corners of the edge surface of the second part to assure proper alignment of the mated parts upon subsequent assembly thereof.

References Cited in the file of this patent

UNITED STATES PATENTS

| | | |
|---|---|---|
| 1,784,256 | Stout | Dec. 9, 1930 |
| 1,812,151 | Jacocks | June 30, 1931 |
| 1,842,571 | Sebell | Jan. 26, 1932 |
| 2,198,146 | Anderson | Apr. 23, 1940 |
| 2,273,931 | Byrnes | Feb. 24, 1942 |
| 2,306,233 | Smith | Dec. 22, 1942 |
| 2,375,822 | Rose | May 15, 1945 |
| 2,496,928 | Bing | Feb. 7, 1950 |
| 2,565,692 | Koerbacher | Aug. 28, 1951 |
| 2,572,956 | Servis | Oct. 30, 1951 |
| 2,795,039 | Hutchins | June 11, 1957 |
| 2,870,533 | Benham | Jan. 27, 1959 |
| 2,885,773 | Molinaro | May 12, 1959 |
| 2,902,752 | Keating | Sept. 8, 1959 |